United States Patent [19]
Iqbal

[11] Patent Number: 5,095,934
[45] Date of Patent: Mar. 17, 1992

[54] FLUID VALVE

[75] Inventor: Muhammad Iqbal, Sheboygan, Wis.

[73] Assignee: Kohler Co., Kohler, Wis.

[21] Appl. No.: 685,809

[22] Filed: Apr. 16, 1991

[51] Int. Cl.$^5$ .............................................. F16K 11/06
[52] U.S. Cl. .................. 137/270; 137/625.41; 137/636.2
[58] Field of Search ............ 137/625.41, 636.3, 636.2, 137/270; 251/285, 288

[56] References Cited

U.S. PATENT DOCUMENTS

| | | | |
|---|---|---|---|
| 3,674,048 | 7/1972 | Manoogian et al. | 137/625.41 |
| 3,823,737 | 7/1974 | Szymanski | 137/607 |
| 4,378,029 | 3/1983 | Parkinson | 137/625.17 |
| 4,387,880 | 6/1983 | Saarisalo | 251/286 X |
| 4,423,752 | 1/1984 | Psarouthakis | 137/625.41 |
| 4,584,723 | 4/1986 | Hussauf | 4/192 |
| 4,676,270 | 6/1987 | Knapp | 137/270 X |
| 4,793,375 | 12/1988 | Marty | 137/270 |
| 4,804,011 | 2/1989 | Knapp | 137/270 |
| 4,813,455 | 3/1989 | Iqbal | 137/625.17 |
| 4,887,642 | 12/1989 | Bernat | 137/625.41 |

FOREIGN PATENT DOCUMENTS

| | | | |
|---|---|---|---|
| 1009924 | 5/1977 | Canada | 137/118 |
| 1019653 | 10/1977 | Canada | 137/118 |
| 0325980 | 8/1989 | European Pat. Off. | |
| 2815990C2 | 10/1984 | Fed. Rep. of Germany | |

*Primary Examiner*—Alan Cohan
*Attorney, Agent, or Firm*—Quarles & Brady

[57] ABSTRACT

A cartridge type valve is disclosed which is capable of having the flow of hot and cold water to the valve reversed. An adapter is provided which is receivable in a valve body and has two independent passages. In one position, the adapter effects respective fluid communication between hot and cold water inlet pipes and hot and cold water inlets in the stationary valve portion. In a second position, when the adapter is removed from the valve body and turned over, communication between the hot and cold water inlet pipes and the hot and cold water inlets in the stationary valve portion is reversed. An adjustable temperature control feature is also provided.

11 Claims, 7 Drawing Sheets

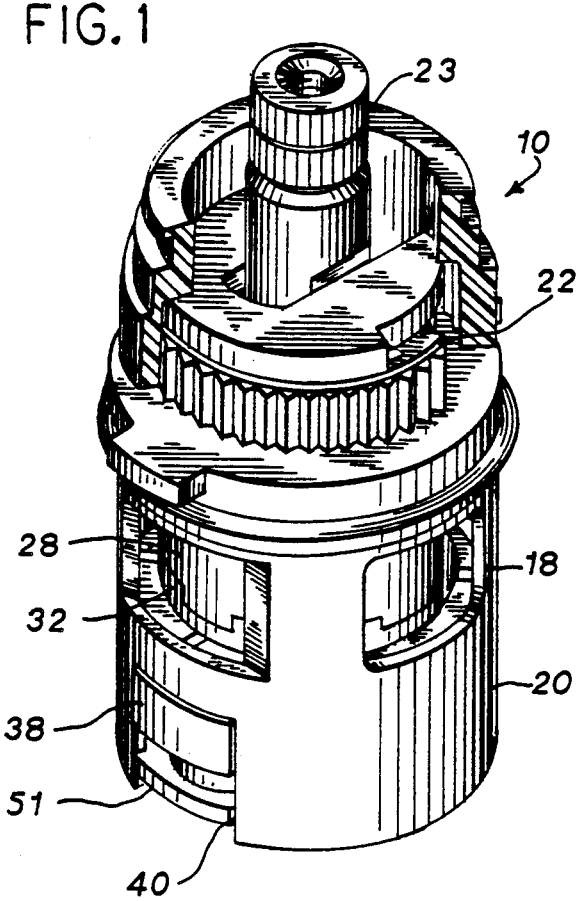
FIG. 1
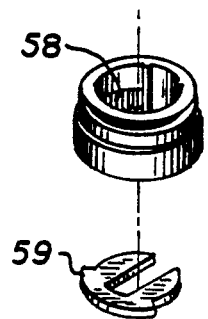
FIG. 2
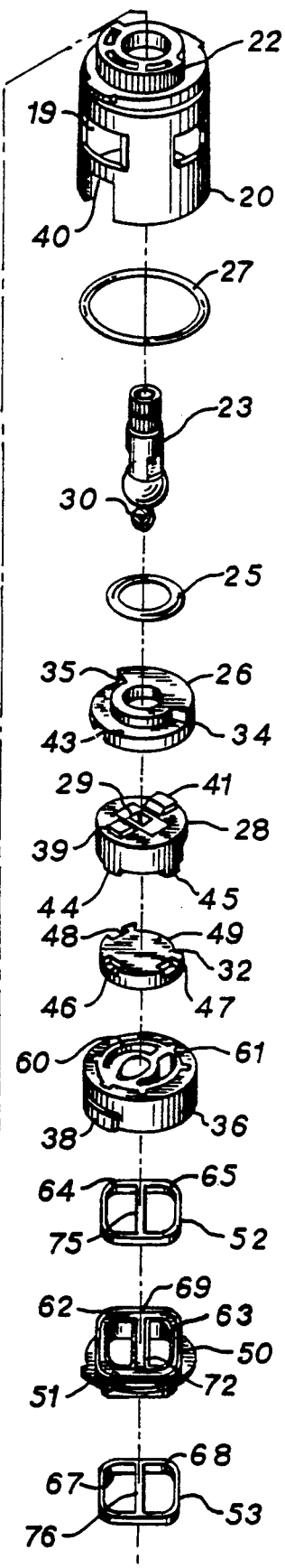

FLUID VALVE

BACKGROUND OF THE INVENTION

A. Field Of The Invention

This invention relates primarily to faucets which control the mix of hot and cold water. More particularly, the invention relates to faucets of the foregoing type wherein the flow path of the hot and cold water can be reversed, and/or where the full hot limit of the valve can be easily adjusted.

B. Description Of The Art

It is often convenient to have faucets in two different rooms placed on opposite sides of a common wall so that both can use common supply pipes. In this situation the cold water supply pipe which is on the right for the first faucet is on the left for the other. If a single type of valve is used at both installations, expensive crossover plumbing is often employed (e.g. U.S. Pat. No. 3,823,737). If not, the plumber sometimes carries two different types of valves.

In the alternative, adapters have been used in order to reverse the flow of hot and cold water through the valves. For example, see U.S. Pat. Nos. 4,378,029; 4,676,270; and 4,804,011. A problem with many of the prior art adapter units is that they are of a multicomponent type, and in some instances are interconnected to one of the flow plates in the faucet housing. In other instances, complicated special seals or attachment devices are required in order to position the reversing mechanism. In other instances, the adapter is positioned internally in the faucet housing requiring significant labor for it to be taken apart in order to effect the desired reversing feature.

Thus, it can be seen that a need exists for an improved reversing system.

Another problem in the art is that of adjustably setting the full hot limit of a valve that has a stem that both pivots and rotates. This is desirable to conserve energy or to set the valve maximums at limits most comfortable to the user. It is desirable to do this without requiring disassembly of valve components and with minimal parts. For example, see U.S. Pat. Nos. 4,387,880; 4,813,455 and 4,887,642.

SUMMARY OF THE INVENTION

In one aspect, the invention provides a valve for use in a housing, the housing having first and second fluid inlets and an outlet, the valve being of a type wherein the flow path of fluid from said inlets through the valve can be interchanged. A valve body has an axial bore, an open lower end for fluid communication with the inlets, and at least one exit in the valve body for fluid communication with the outlet.

A stationary valve element has a first and a second fluid pathway, and a movable valve element, both elements being positioned in the axial bore for regulating fluid flow of first and second fluids from the housing inlets through the valve in response to movement of the movable element over the stationary element or portion.

An adapter member is receivable between the inlets and pathways. The adapter is constructed and arranged to provide in a first position communication between the first inlet and the first pathway while also providing separate communication between the second inlet and the second pathway, wherein the adapter is also constructed with two separate and direct flow paths therethrough such that when it is turned over from the first position and placed between the inlets and pathways, the adapter provides communication between the first inlet and the second pathway, while also providing separate communication between the second inlet and the first pathway.

In a preferred form the adapter has a projection extending radially from an exterior surface thereof for orientation in a slot of the valve body, the projection being located with respect to the passages so that when the adapter is turned over and the flange is repositioned in the slot, the passages are directed 90° from their original direction.

In one aspect, the adapter is received in the valve body in a friction fit manner.

In another aspect, the adapter includes two independent passages which extend directly through the adapter.

In yet another aspect, the passages in the adapter are elongated and have a common barrier wall, and when the adapter is received in the valve body the passages extend in a direction at about 45° with respect to a line connecting the first and second fluid pathways.

In another preferred form, the valve body has a lower housing with inlet ports of different geometric configurations.

In still another preferred form, there is a rotatable and pivotal valve stem within the upper end of the valve body, the valve stem having one end extending outside the valve body with the valve being constructed and arranged so that the movable valve element moves in response to rotation or pivoting of the stem.

In yet another preferred form, there is a temperature control feature wherein the portion of valve stem outside of the valve body has at least one flat portion, and the valve further includes:

a stop plate having a slot for receiving the stem in a manner such that the stem can pivot in the slot and such that rotations of the stem can rotate the plate. A collar member surrounds the stem and stop plate and is connectable to the valve body, and has a stop surface therein, and the stop plate also having at least one stop surface for engagement with a stop surface of the collar member upon rotation of the stem.

The objects of the invention therefore include:

a. providing a valve of the above kind which is readily convertible to hot and cold water supply lines irrespective of their positioning;

b. providing a valve of the above kind which can be manufactured with few parts;

c. providing a valve of the above kind which is easily removed from and replaced in a valve cartridge housing;

d. providing an adapter for a valve of the above kind which can be provided in various geometrical configurations to fit various styles of valve cartridge bodies;

e. providing a valve of the above kind which has different geometric configurations of the flow paths into the stationary valve portion; and f. providing a valve of the above kind which has an adjustable temperature control feature.

These and still other objects and advantages of the invention will be apparent from the description which follows. In the detailed description below, the preferred embodiments of the invention will be described in reference to the accompanying drawings. These embodiments do not represent the full scope of the invention.

Rather the invention may be employed in other embodiments. Reference should therefore be made to the claims herein for interpreting the breadth of the invention.

BRIEF DESCRIPTION OF THE DRAWINGS

FIG. 1 is a perspective view showing a valve assembly constituting a preferred embodiment of the invention;

FIG. 2 is an exploded perspective view of the valve assembly parts shown in FIG. 1;

DESCRIPTION OF THE PREFERRED EMBODIMENTS

Figure 3:
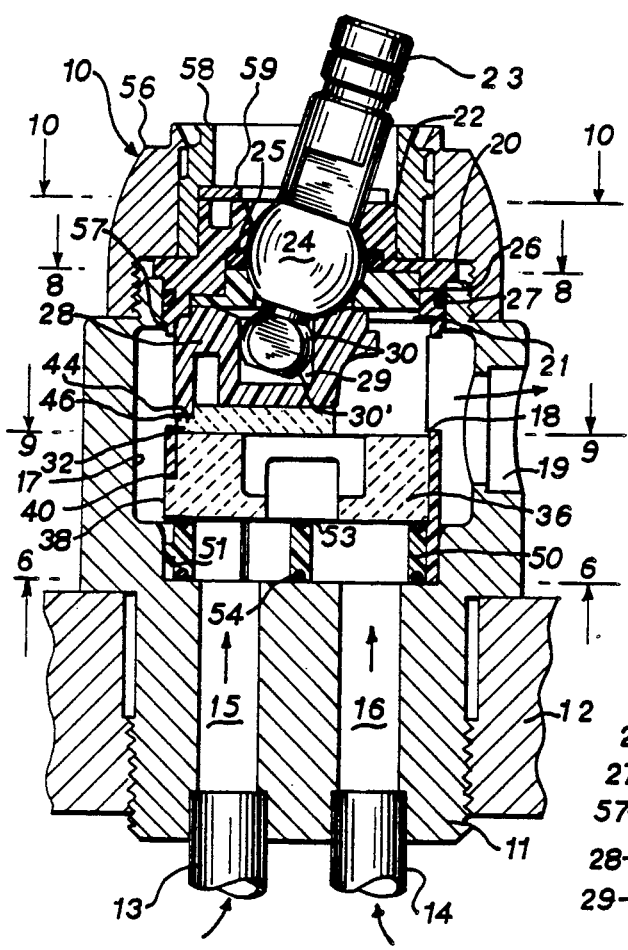
FIG. 3 is a view in vertical section of the valve assembly shown in FIG. 1, with the assembly being mounted in a faucet housing and on a support.
Figure 4:
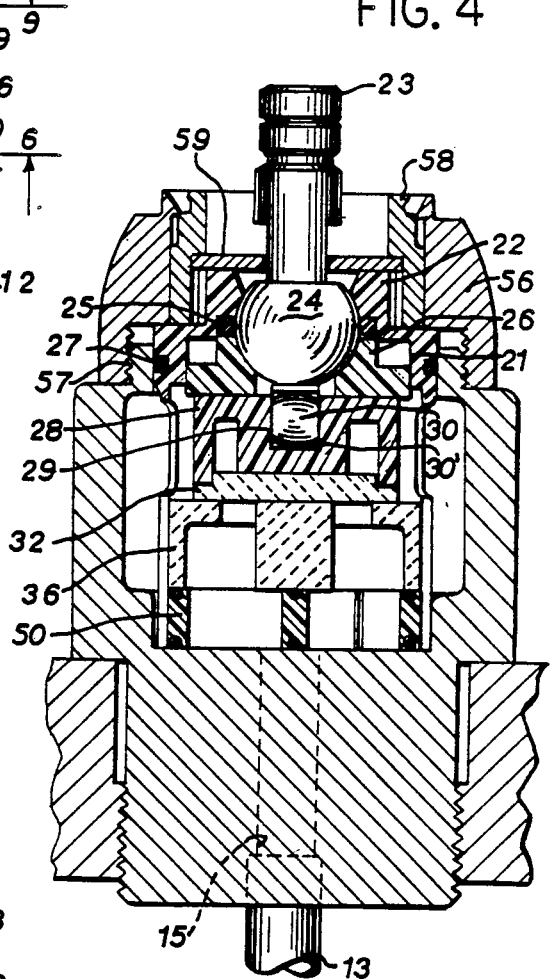
FIG. 4 is a view similar to FIG. 3, with the view taken 90° therefrom.
Figure 5:
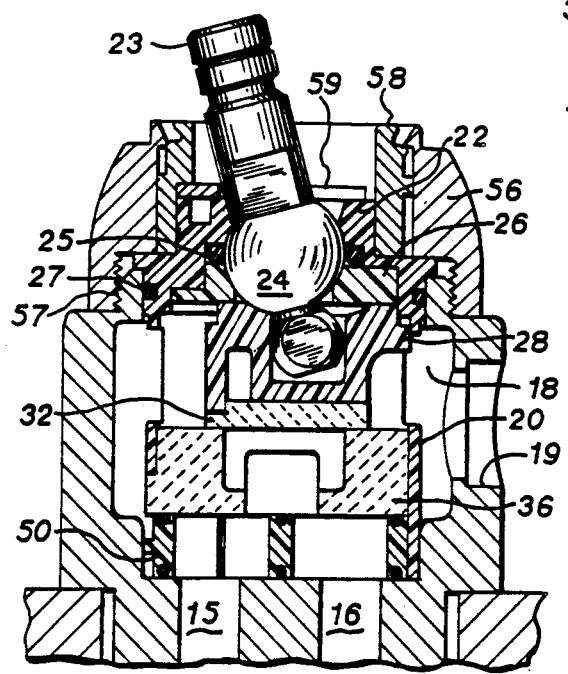
FIG. 5 is a view similar to FIG. 3 showing the valve in a different mode of operation.

Referring to FIGS. 1 and 3, the cartridge valve assembly generally 10 is shown in conjunction with a faucet housing 11 that is mounted on a support 12 in the usual manner. The housing 11 has the usual bottom hot water inlet 13 and a cold water inlet 14. The direction arrows in FIG. 3 illustrate the pathway of water through the cartridge valve from the hot water pipe 13 and the cold water pipe 14 upwardly through the hot water inlet 15 and the cold water inlet 16, up through the valve to the side openings 18 and out into a cavity 17 between the valve 10 and the faucet housing 11. The water will be directed out of the faucet housing through the outlet 19.

As best seen in FIGS. 2-5, plastic valve housing 20 has a sleeve 22 for captively receiving a brass valve stem 23. The usual knob (not shown) can be placed on the grooved outer end of the stem. The valve body 20 has a bore 21 for receiving a slide disk 26 on which the ball portion 24 of the valve stem rests. An O-ring seal 25 is placed between the slide disk 26 and the sleeve 22, and a seal 27 is held between valve body 20 and the faucet housing 11. The ball 24 of the valve stem 23 is such a size that it will not pass up through the sleeve 22.

The valve stem 23 is connected to a socket 28 by means of a key 30 having flat sides 30' placed in a slotted pocket 29. As best seen in FIG. 2, the socket 28 has projections 44 and 45 for engaging indents 46, 47 and 48 of a moving disk 32. The moving disk 32 and a stationary disk 36 are preferably of the ceramic type and are housed in the cavity 17 of the valve body 20. The stationary disk 36 is held in the bore 21 in a friction fit manner and in a nonrotatable manner by the projection 38 extending into a slot 40 in the valve body.

In accordance with the present invention, positioned below the stationary disk 36 is an adapter 50 which like the stationary disk 36 is held in the bore 21 in a friction fit manner. Also similar to the stationary disk 36 it has a projection 51 for orientating in the slot 40. In addition to the friction fitting of the stationary disk 36 and the adapter 50 in the bore 21, the adapter 50 rests on the faucet housing 11. Retention of the valve body 20 in the faucet housing 11 is effected by the bonnet 56 which is threaded to the housing 11 by the threads 57 and in turn captively retains the valve body 20 in the faucet housing 11.

Figure 6:
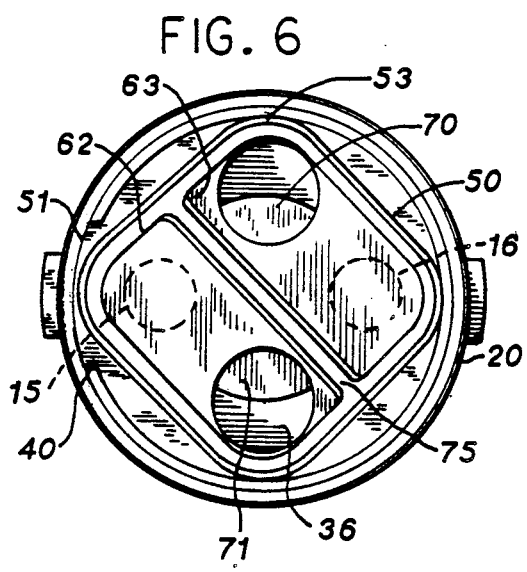
FIG. 6 is a sectional view taken along line 6—6 of FIG. 3.
Figure 7:
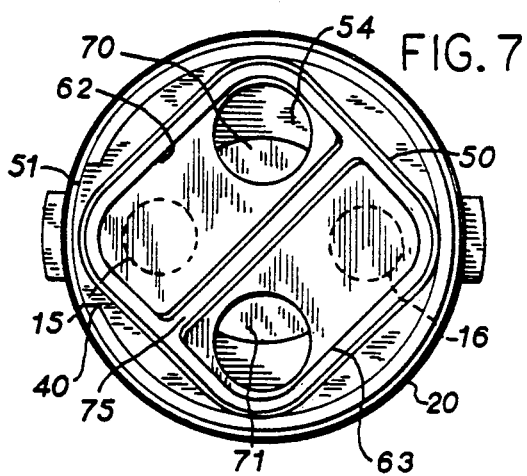
FIG. 7 is a view similar to FIG. 6 showing a different orientation of the adapter unit relative to the cartridge.

As best seen in conjunction with FIGS. 2, 6 and 7, the adapter 50 has two opposing D-shaped openings 62 and 63 separated by a median wall 72. Opposing seals 52 and 53 are housed in opposing sides of the adapter 50 and are carried therein such as by the cavity portion 69. The seals 52 and 53 have complementary D-shaped openings 64, 65, 67 and 68 as well as respective median walls 75 and 76.

Figure 8:
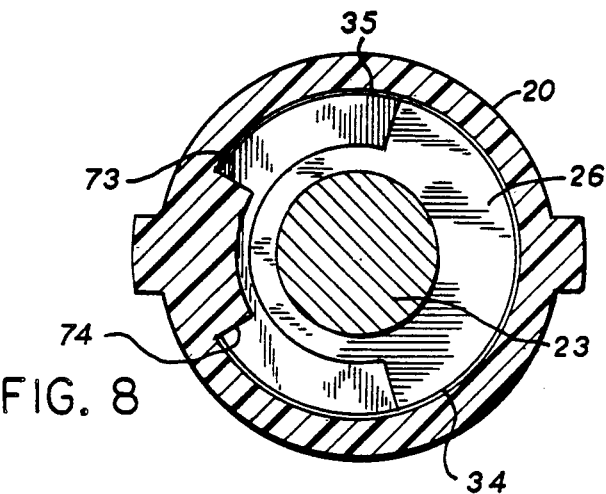
FIG. 8 is a sectional view taken along line 8—8 of FIG. 3.

Referring specifically to FIG. 8, the internal stop feature for the valve stem 23 is illustrated. There it is seen that the slide 26 has two stop surfaces 34 and 35 for engagement with internal stop surfaces 74 and 73 in valve body 20. As best seen in conjunction with FIG. 2, slide 26 is rotated by the projections 39 and 41 of the socket engaging a slot 43 in the slide 26. Accordingly, when socket 28 is rotated by the key 30 of the valve stem 23, slide 26 will also be rotated.

Figure 9:
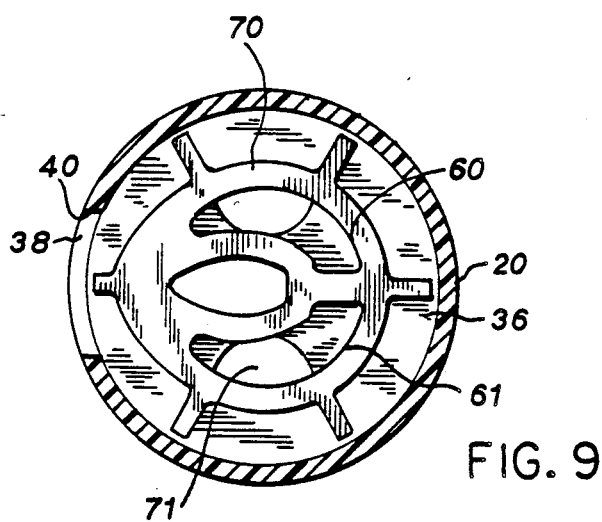
FIG. 9 is a sectional view taken along line 9—9 of FIG. 3.

Referring to FIG. 9, the flow path of water through the stationary disk 36 in the valve body 20 is best illustrated. There it is seen that inlet water will enter from the bottom through the rounded openings 70 and 71 which rounded openings merge into arcuate passages 60 and 61 at the top. It is these arcuate passages over which the moving disk 32 rotates or axially moves in response to rotation or a pivoting of the valve stem 23. This modulates and translates hot and cold water exiting from these arcuate passages 60 and 61. Reference is made to FIG. 3, which shows the valve in the fully opened position and to FIG. 5 which shows it in the closed position.

An important feature of the present invention is the adapter 50 which use is best visualized in conjunction with FIGS. 6 and 7. If it is assumed that for proper operation of the valve assembly 10, that hot water should enter opening 71 of the stationary disk 36 and cold water should enter opening 70, then the adapter 50 as positioned in FIG. 6 will effect this direction of hot and cold water. Note that in this instance, the opening 62 of the adapter 50 provides a pathway for hot water inlet 15 to inlet opening 71, and opening 63 in the adapter 50 provides a pathway of water from cold water inlet 16 to inlet opening 70. If the hot and cold water inlets 15 and 16 are now reversed, which is a situation wherein a common wall installation is involved as previously explained, then cold water would flow in through water inlet 15 and hot water through inlet 16. In this reversed situation and in order to now have cold water presented to inlet opening 70, and hot water to inlet opening 71, the flow paths must be reversed.

This is accomplished as illustrated in FIG. 7 where adapter opening 62 now presents the flow path from now cold water inlet 15 to inlet opening 70 and, opening 63 in the adapter presents a flow path from now hot water inlet 16 to inlet opening 71. This reversal of pathways is effected by merely removing the adapter 50 from the valve body 20 in its position in FIG. 6, turning it completely over, and then reinserting the adapter 50 so that the projection 51 is reorientated in the valve body slot 40. In comparing the openings 62 and 63 in the adapter as shown in FIG. 6 to that shown in FIG. 7, it will be seen that they have now been moved 90° apart as is best visualized in comparing the median wall 75 in FIG. 6 to its position in FIG. 7. This displacement is effected by the unique geometric construction of the adapter with the elongated flow paths and the positioning of projection 51.

Figure 10:
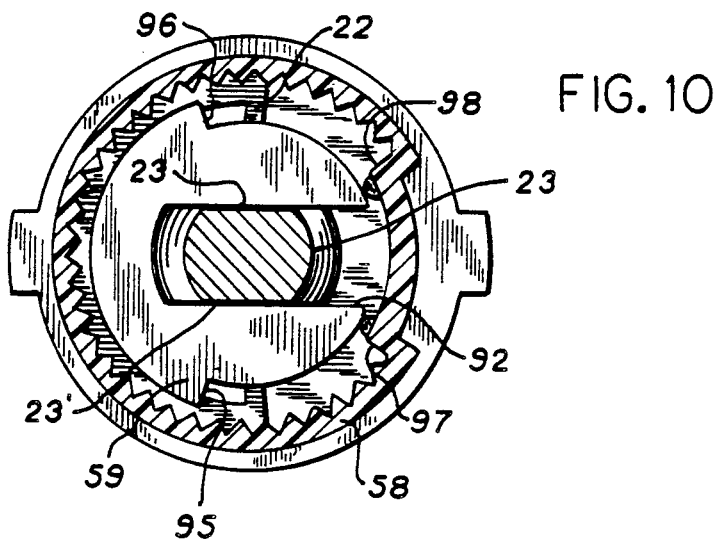
FIG. 10 is a sectional view taken along line 10—10 of FIG. 3.
Figure 11:
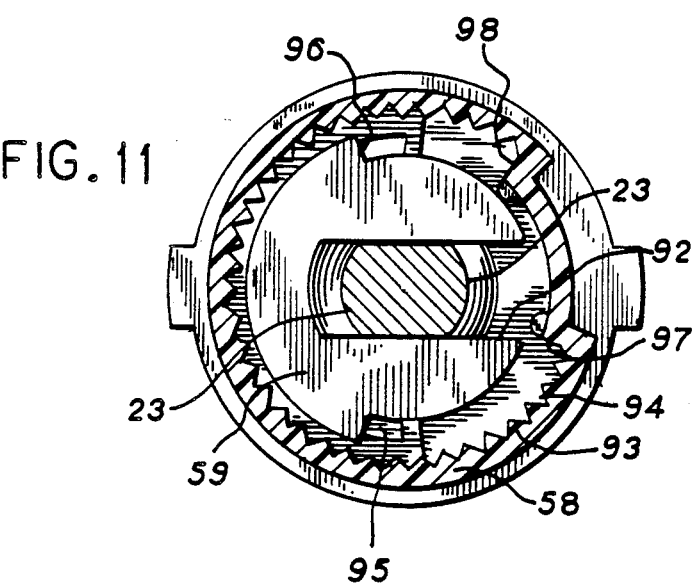
FIGS. 11 and 12 are views similar to FIG. 10 showing a different orientation of the collar member.
Figure 12:
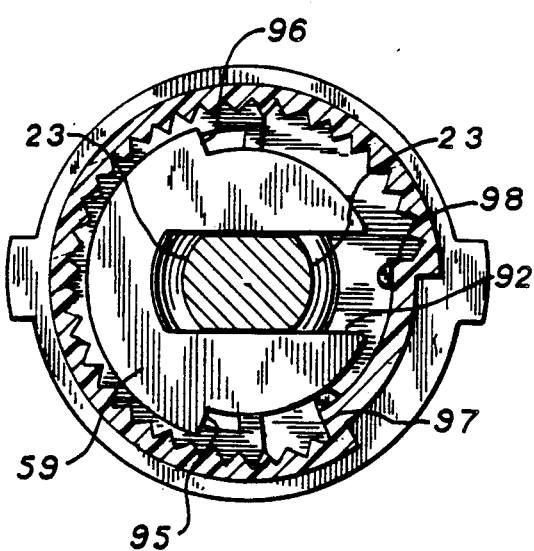
Figure 13:
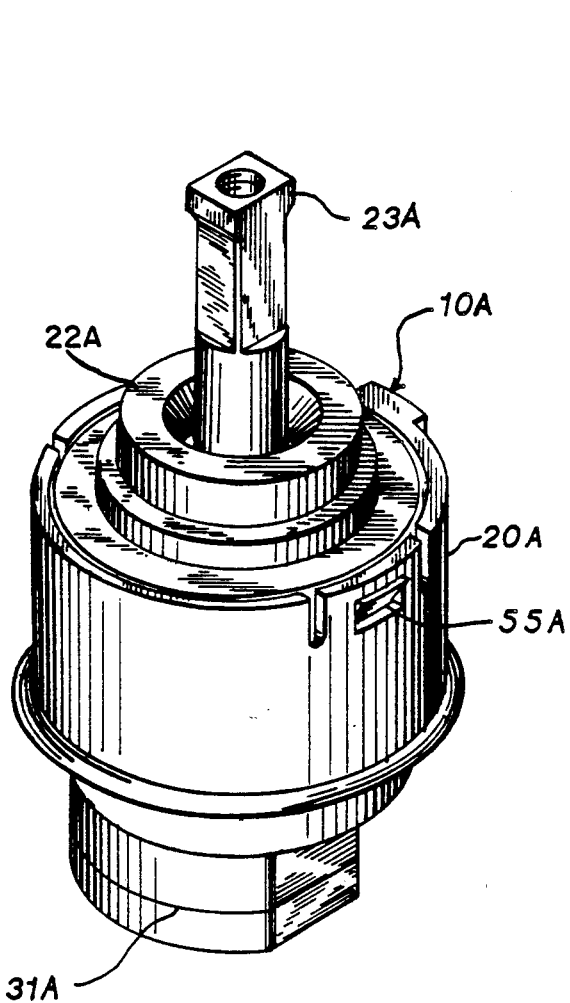
FIG. 13 is a view similar to FIG. 1 showing an alternative embodiment.
Figure 14:
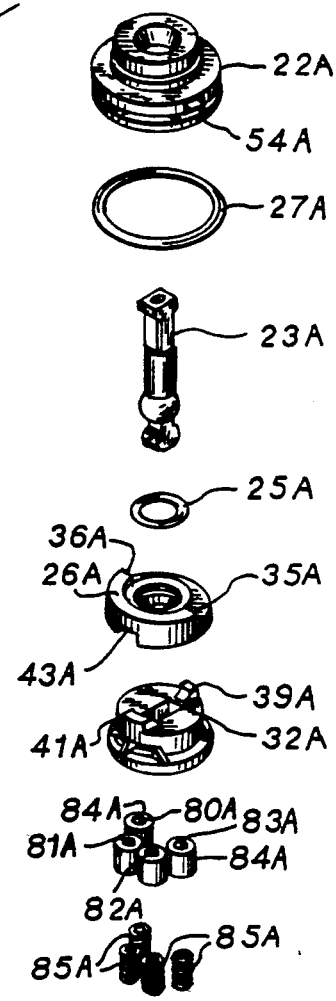
FIGS. 14–17 are views similar to FIGS. 2-5, respectively, but of the alternative embodiment of FIG. 13.
Figure 14:
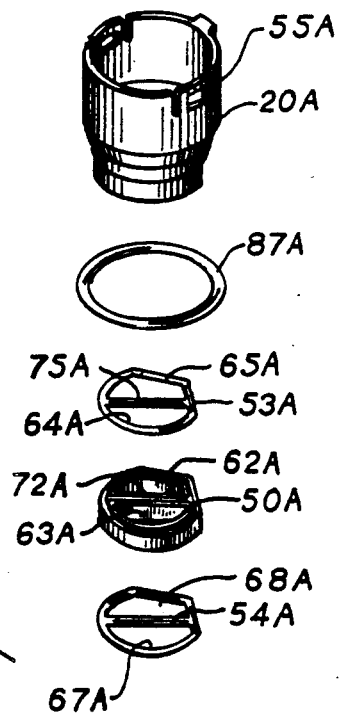
Figure 15:
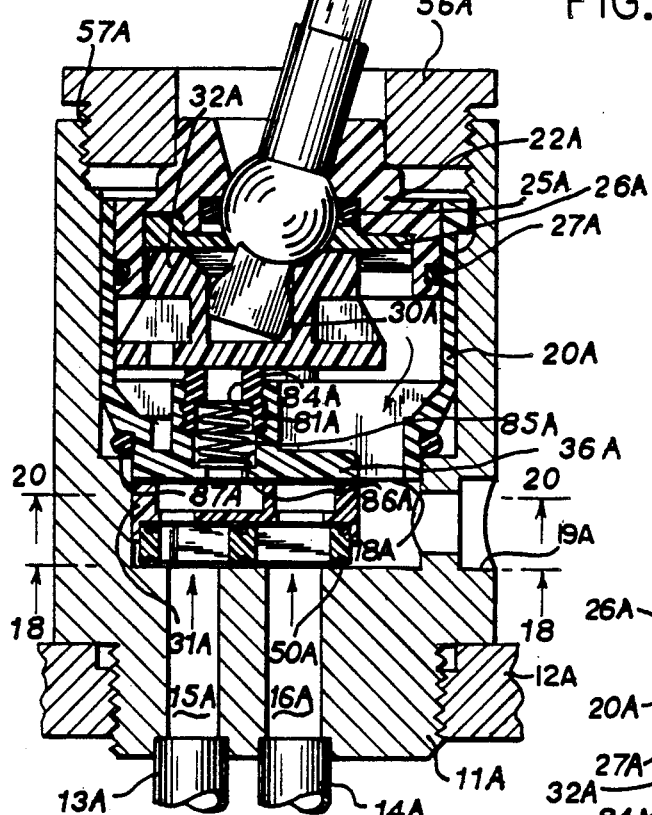
Figure 16:
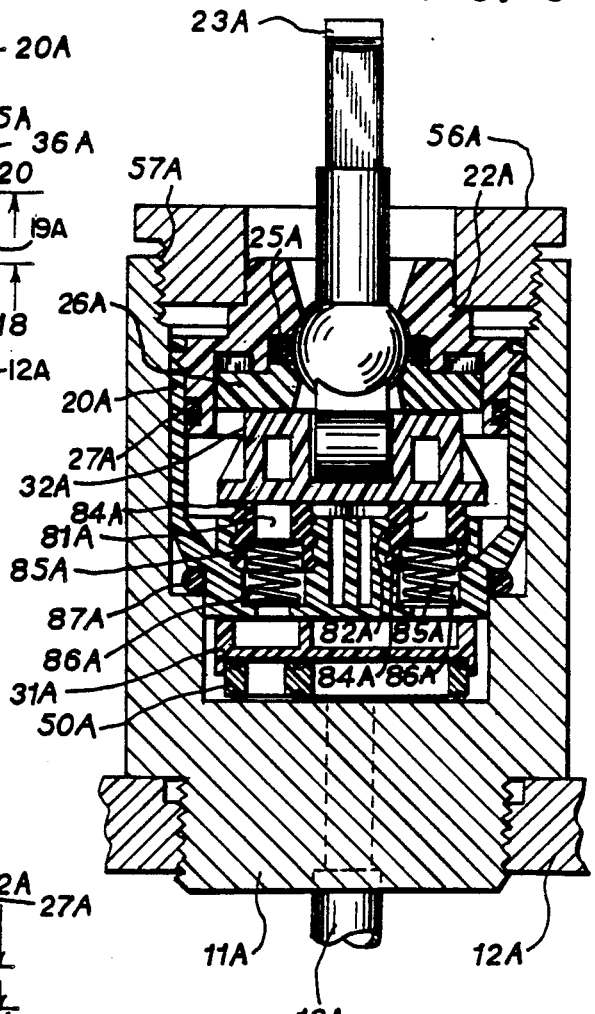
Figure 17:
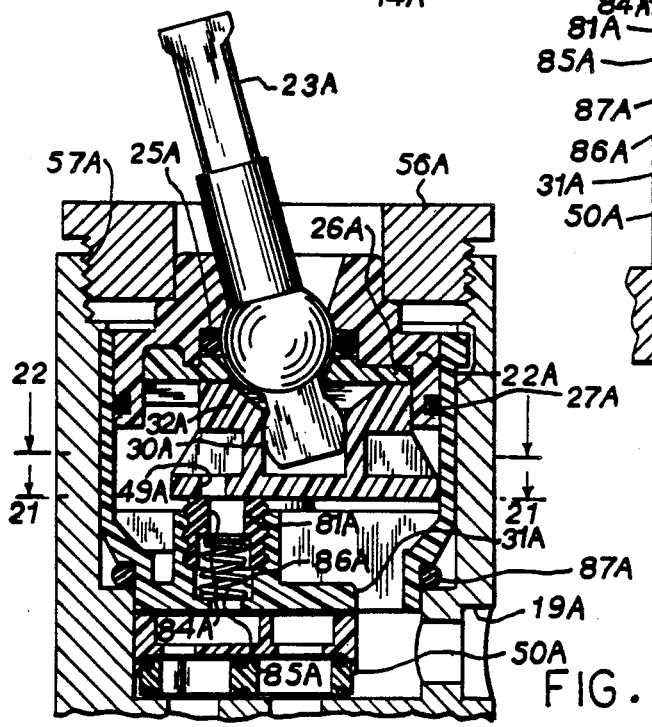

An adjustable temperature control feature is shown in FIGS. 10-12. It includes a stop plate 59 having the slot 92 for slidable engagement with the flat sides 23' and 23" of stem 23. An adjustable collar 58 having teeth 93 is adjustably positioned over the sleeve 22 which has meshing teeth 94. Stop plate 59 has stop surfaces 95 and 96 for contact with the stop surfaces 97 and 98 of collar 58. This contact limits the movement of the moving disk 32 over the stationary disk 36 and consequently the degree to which passages 60 and 61 can be closed, thus regulating the maximum temperature of the water. The adjustment aspect is seen in comparing the positions of the collar stop surfaces 97 and 98 in FIGS. 10-12.

Referring to the alternative embodiment generally 10A shown in FIGS. 13-22, the same or similar components are designated with the same reference numerals as for the first embodiment, except followed by the letter "A". One of the differences between the two embodiments is the resilient valve seat inlets 80A-83A for sliding contact with the plastic sliding disk type valve member 32A. This is specifically seen in FIGS. 14-17 and 21. An analogous multiport arrangement as well as the sliding disk (without reversing adapter) is described in U.S. Pat. No. 4,478,249. The inlets 80A-83A are sealed by four annular seals 84A which are mounted on springs 85A, the spring mounted seals being seated in bores 86A. In this instance, it will be seen that the moving disk 32A serves the function of the previously described socket 28 and moving disk 32. A lower housing portion 31A is also provided to accommodate the adapter 50A as well as provide a flow path of water to the respective valve seat inlets 80A-83A.

Another difference between the embodiments 10 and 10A is the engagement of the sleeve 22A and the valve body 20A by the frictional engagement of the projections 54A in the slots 55A. An O-ring seal 87A is placed between the valve body 20A and the faucet housing 11A.

Figure 18:
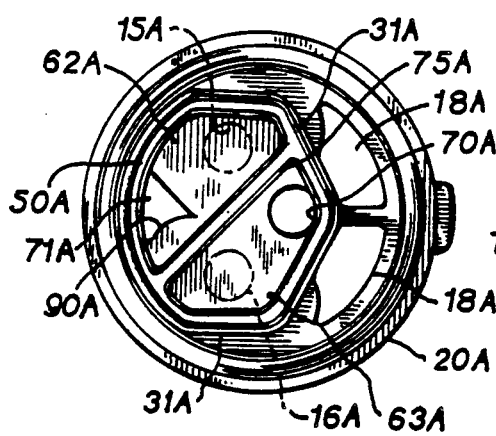
FIG. 18 is a sectional view taken along line 18-18 of FIG. 15.
Figure 20:
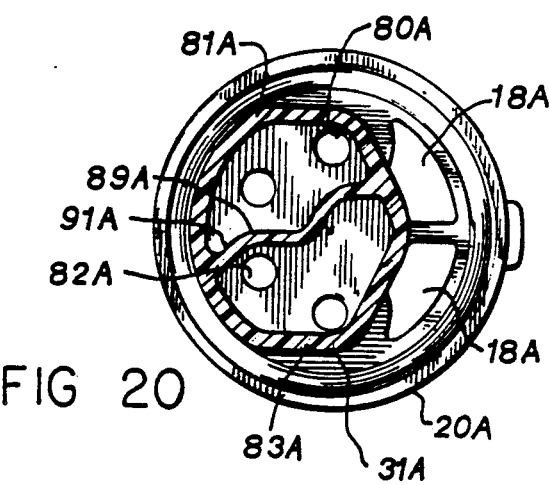
FIG. 20 is a sectional view taken along line 20-20 of FIG. 15.
Figure 21:
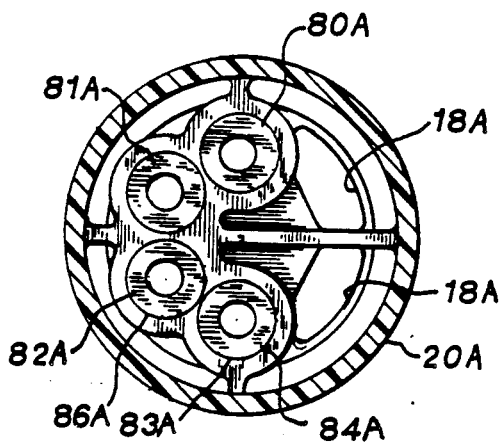
FIG. 21 is a sectional view taken along line 21-21 of FIG. 17.

As best seen in conjunction with FIGS. 18 and 20, there is a generally triangular shaped opening 71A and a round opening 70A for introducing hot and cold water into the bottom of the lower housing 31A. In this instance water entering inlet 71A will be fed to valve seat inlets 80A and 81A and, water entering inlet 70A will be fed to valve seat inlets 82A and 83A. Lower housing 31A has a serpentine like partition wall 89A which separates the flow paths for this purpose. Note that in this instance the curved wall 90A of the opening 71A matches the curved wall portion 91A of the partition 89A. This is to afford an opposite positioning of the inlets 71A and 70A and provide optimum positioning of the median wall 75A of the seal 53A and accordingly median wall 72A of the adapter 50A.

Figure 22:
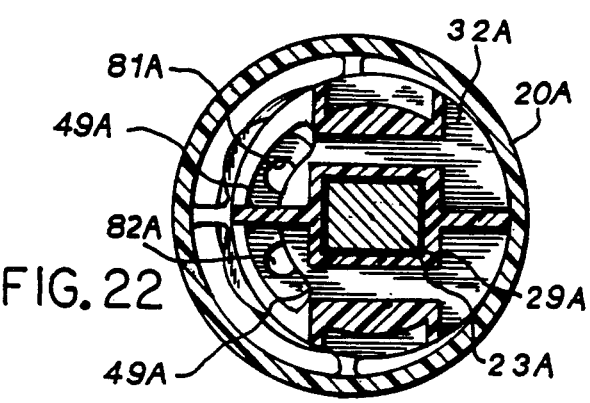
FIG. 22 is a sectional view taken along line 20-20 of FIG. 17.

As best seen in FIG. 22, the flow of hot and cold water is regulated through the valve seat inlets 81A and 82A when the relief areas 49A of the moving disk 32A are moved thereover. Note also that there are two openings 18A for the exiting of water at the bottom of the valve body 20A. This is best seen in conjunction with FIGS. 18-20.

Figure 19:
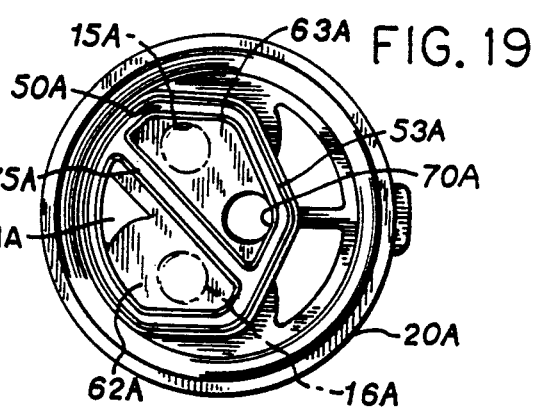
FIG. 19 is a view similar to FIG. 18 showing a different orientation of the adapter unit relative to the cartridge.

FIGS. 18 and 19 specifically demonstrate the use of the adapter 50A to switch the flow of hot and cold water from the respective inlets 15A and 16A to the respective hot and cold water inlets into the valve body shown at 71A and 70A, respectively. The difference in this instance is that the projection 51, utilized in conjunction with the adapter 50, is not employed, but instead the geometric or polysided configuration of both the adapter and the lower housing 31A is utilized for relocating the adapter 50A once it is removed and flipped over.

It will therefore be appreciated that a hot to cold water or cold to hot water conversion can be achieved in a mixing valve by merely removing an adapter, turning it over top to bottom and replacing it. An additional advantage in this respect is afforded as the adapter is positioned at the bottom of the valve housing so no parts need be removed from the valve body to afford access.

Still another feature of the valve assembly resides in the adapters not requiring any side seals in contact with the valve housing. Another feature is the fact that pairs of inlet openings are designed with different geometric configurations. This affords maximum flow of water to the inlet parts in the valve body in conjunction with the adapter.

Yet another feature is the ability to adjust the temperature of the water through the valve assembly so that hot water scalding can be avoided.

Thus, the invention provides an improved valve assembly. While the preferred embodiments have been described above, it should be readily apparent to those skilled in the art that a number of modifications and changes may be made without departing from the spirit and scope of the invention. For example, while a plumbing valve has been shown, the valve can be used with other types of fluid valves. Also, the specific materials mentioned are not the only materials which can be used. All such and other modifications within the spirit of the invention are meant to be in the scope of the invention.

I claim:

1. A valve for use in a housing, the housing having first and second fluid inlets and an outlet, the valve being of a type wherein the flow path of fluid from said inlets through the valve can be interchanged, comprising:

a valve body having an axial bore, an open lower end for fluid communication with the inlets, and at least one exit in the valve body for fluid communication with the outlet;

a stationary valve element having a first and a second fluid pathway, and a movable valve element, both elements being positioned in the axial bore for regulating fluid flow of first and second fluids from the housing inlets through the valve in response to movement of the movable element over the stationary element; and an adapter member receivable between the inlets and pathways, wherein the adapter is constructed and arranged to provide in a first position communication between the first inlet and the first pathway while also providing separate communication between the second inlet and the second pathway;

wherein the adapter is also constructed with two separate and direct flow paths extending in a substantially straight line therethrough such that when it is turned over from the first position and placed between the inlets and pathways, the adapter provides communication between the first inlet and the second pathway, while also providing separate communication between the second inlet and the first pathway.

2. The valve of claim 1, wherein the adapter is received in the valve body.

3. The valve of claim 1, wherein there is a rotatable and pivotal valve stem within the upper end of the valve body, the valve stem having one end extending outside the valve body;

the valve being constructed and arranged so that the movable valve element moves in response to rotation or pivoting of the stem.

4. A valve for use in a housing, the housing having first and second fluid inlets and an outlet, the valve comprising;

a valve body having an axial bore;

a stationary valve element having a first and a second fluid pathway, and a movable valve element, both elements being positioned in the axial bore for regulating fluid flow of first and second fluids through the valve in response to movement of the movable element over the stationary element;

a rotatable and pivotable valve stem within the upper end of the valve body that has an end portion extending outside the valve body, the valve stem portion extending outside the valve body having at least one flat portion;

a stop plate having a slot for receiving the stem in a manner such that the stem can pivot in the slot and such that rotations of the stem rotates the plate; and a collar member surrounding the stem and stop plate and being connectable to the valve body, and having a stop surface therein;

wherein the stop plate also has at least one stop surface for engagement with a stop surface of the collar member upon rotation of the stem.

5. The valve of claim 4, wherein there are a plurality of teeth on both the collar member and the valve body for adjustably connecting the collar member to the valve body at a plurality of different relative positions.

6. A valve for use in a housing, the housing having first and second fluid inlets and an outlet, the valve being of a type wherein the flow path of fluid from said inlets through the valve can be interchanged, comprising:

a valve body having an axial bore, an open lower end for fluid communication with the inlets, and at least one exit in the valve body for fluid communication with the outlet;

a stationary valve element having a first and a second fluid pathway, and a movable valve element, both elements being positioned in the axial bore for regulating fluid flow of first and second fluids from the housing inlets through the valve in response to movement of the movable element over the stationary element; and an adapter member receivable between the inlets and pathways, wherein the adapter is constructed and arranged to provide in a first position communication between the first inlet and the first pathway while also providing separate communication between the second inlet and the second pathway;

wherein the adapter is also constructed with two separate and direct flow paths therethrough such that when it is turned over from the first position and placed between the inlets and pathways, the adapter provides communication between the first inlet and the second pathway, while also providing separate communication between the second inlet and the first pathway, said flow paths defined by two independent passages which extend directly through the adapter with the passages being elongated and have a common barrier wall, and when the adapter is received in the valve body the passages extend in a direction at about 45° with respect to a line connecting the first and second fluid pathways.

7. A valve for use in a housing, the housing having first and second fluid inlets and an outlet, the valve being of a type wherein the flow path of fluid from said inlets through the valve can be interchanged, comprising:

a valve body having an axial bore, an open lower end for fluid communication with the inlets, and at least one exit in the valve body for fluid communication with the outlet;

a stationary valve element having a first and a second fluid pathway, and a movable valve element, both elements being positioned in the axial bore for regulating fluid flow of first and second fluids from the housing inlets through the valve in response to movement of the movable element over the stationary element; and an adapter member receivable between the inlets and pathways, wherein the adapter is constructed and arranged to provide in a first position communication between the first inlet and the first pathway while also providing separate communication between the second inlet and the second pathway;

wherein the adapter is also constructed with two separate and direct flow paths therethrough such that when it is turned over from the first position and placed between the inlets and pathways, the adapter provides communication between the first inlet and the second pathway, while also providing separate communication between the second inlet and the first pathway;

said adapter including two independent passages which extend directly through the adapter, the adapter having a projection extending radially from an exterior surface thereof for orientation in a slot of the valve body, the projection being located with respect to the passages so that when the adapter is turned over and the projection is repositioned in the slot, the passages are directed 90° from their original direction.

8. The valve of claim 7, wherein the adapter is received in the valve body in a friction fit manner.

9. A valve for use in a housing, the housing having first and second fluid inlets and an outlet, the valve being of a type wherein the flow path of fluid from said inlets through the valve can be interchanged, comprising:
- a valve body having an axial bore, an open lower end formed by a housing with inlet ports of different configurations for fluid communication with the inlets, and at least one exit in the valve body for fluid communication with the outlet;
- a stationary valve element having a first and second fluid pathway, and a movable valve element, both elements being positioned in the axial bore for regulating fluid flow of first and second fluids from the housing inlets through the valve in response to movement of the movable element over the stationary element; and
- an adapter member receivable between the inlets and pathways, wherein the adapter is constructed and arranged to provide in a first position communication between the first inlet and the first pathway while also providing separate communication between the second inlet and the second pathway;
- wherein the adapter is also constructed with two separate and direct flow paths therethrough such that when it is turned over from the first position and placed between the inlets and pathways, the adapter provides communication between the first inlet and the second pathway, while also providing separate communication between the second inlet and the first pathway.

10. A valve for use in a housing, the housing having first and second fluid inlets and an outlet, the valve being of a type wherein the flow path of fluid from said inlets through the valve can be interchanged, comprising:
- a valve body having an axial bore, an open lower end for fluid communication with the inlets, and at least one exit in the valve body for fluid communication with the outlet;
- a stationary valve element having a first and a second fluid pathway, and a movable valve element, both elements being positioned in the axial bore for regulating fluid flow of first and second fluids from the housing inlets through the valve in response to movement of the movable element over the stationary element;
- an adapter member receivable between the inlets and pathways, wherein the adapter is constructed and arranged to provide in a first position communication between the first inlet and the first pathway while also providing separate communication between the second inlet and the second pathway;
- wherein the adapter is also constructed with two separate and direct flow paths therethrough such that when it is turned over the from the first position and placed between the inlets and pathways, the adapter provides communication between the first inlet and the second pathway, while also providing separate communication between the second inlet and the first pathway;
- a rotatable and pivotal valve stem within the upper end of the valve body, the valve stem having one end extending outside the valve body;
- the valve being constructed and arranged so that the movable valve element moves in response to rotation or pivoting of the stem, the portion of valve stem outside of the valve body having at least one flat portion;
- a stop plate having a slot for receiving the stem in a manner such that the stem can pivot in the slot and such that rotations of the stem can rotate the plate; and
- a collar member surrounding the stem and stop plate and being connectable to the valve body, and having a stop surface therein, and the stop plate also having at least one stop surface for engagement with a stop surface of the collar member upon rotation of the stem.

11. The valve of claim 10, wherein there are a plurality of teeth on both the collar member and valve body for adjustably connecting the collar member to the valve body at a plurality of different relative positions.

* * * * *